(12) United States Patent
Feldman et al.

(10) Patent No.: US 6,516,342 B1
(45) Date of Patent: Feb. 4, 2003

(54) METHOD AND APPARATUS FOR EXTENDING MEMORY USING A MEMORY SERVER

(75) Inventors: Stuart Feldman, Stamford, CT (US); Geoffrey D. McNiven, Croton-on-Hudson, NY (US); Ronald Marz, South Salem, NY (US); James Venuto, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,608

(22) Filed: Jul. 17, 1998

(51) Int. Cl.[7] ............................................... G06F 13/00
(52) U.S. Cl. ......................... 709/216; 709/213; 711/2; 711/147
(58) Field of Search .................... 709/213, 214, 709/215, 216; 711/2, 170, 147, 206, 207

(56) References Cited

U.S. PATENT DOCUMENTS

| | | | | |
|---|---|---|---|---|
| 4,240,143 A | * | 12/1980 | Besemer et al. | 710/104 |
| 4,253,146 A | * | 2/1981 | Bellamy et al. | 709/226 |
| 4,843,541 A | | 6/1989 | Bean et al. | 710/36 |
| 5,095,420 A | | 3/1992 | Eilert et al. | 711/209 |
| 5,159,667 A | | 10/1992 | Borrey et al. | 707/500 |
| 5,218,677 A | | 6/1993 | Bono et al. | 710/52 |
| 5,237,668 A | | 8/1993 | Blandy et al. | 711/2 |
| 5,442,802 A | * | 8/1995 | Brent et al. | 709/100 |
| 5,592,625 A | * | 1/1997 | Sandberg | 711/147 |
| 5,918,249 A | * | 6/1999 | Cox et al. | 711/203 |
| 6,026,474 A | * | 2/2000 | Carter et al. | 711/202 |
| 6,044,438 A | * | 3/2000 | Olnowich | 711/130 |
| 6,148,377 A | * | 11/2000 | Carter et al. | 711/147 |
| 6,185,655 B1 | * | 2/2001 | Peping | 711/6 |
| 6,298,419 B1 | * | 10/2001 | Kontothanassis et al. | 711/147 |

OTHER PUBLICATIONS

Womack, Lucas, et al., *A Study of Virtual Memory MTU Reassembly within the PowerPC Architecture*, IEEE, pp. 81–90 (1997).

* cited by examiner

Primary Examiner—Kenneth R. Coulter
(74) Attorney, Agent, or Firm—F. Chau & Associates, LLP

(57) ABSTRACT

A method and apparatus for extending the main memory of computer systems across network boundaries is provided. A memory server is allocated on a network server, or a separate machine connected to a network to enable client computers on the network to extend their main memory on demand for user applications. Through the utilization of the memory server, the client workstations can execute programs requiring more memory than is resident on the client without decreasing the efficiency of the network server.

15 Claims, 3 Drawing Sheets

METHOD AND APPARATUS FOR EXTENDING MEMORY USING A MEMORY SERVER

BACKGROUND OF THE INVENTION

1. Field of the Invention

The present invention relates to memory management in computer systems. More particularly, it relates to a method and apparatus for extending the main memory of a computer system across network boundaries.

2. Prior Art

Traditional computer systems extend main memory through the use of paging to mass storage devices, such as, for example, hard disks. Paging is the use of virtual memory assignments to physical memory addresses to allow swapping of pages between physical memory and mass storage (i.e., mechanical disk drives) as necessary for execution of a given program. The use of virtual memory is pervasive in the industry and is common knowledge. Paging to mechanical disk drives decreases efficiency and speed as a result of the mechanical limitations of the drive.

The method and system for storing data in and retrieving data from a non-main storage virtual data space disclosed in U.S. Pat. No. 5,159,667 describes a data space that is backed by an expanded and auxiliary storage. This creates issues of correctness when the main store is modified. In addition, mechanisms to provide updates to the auxiliary store are described in detail.

U.S. Pat. No. 5,237,668 discloses a process of using virtual addressing in a non-privileged instruction to control the copying of a page of data in or between multiple media. The process describes the mechanisms a user may utilize to obtain a copy of a page of data from any media in an extended memory environment.

The method and system for performing virtual address range mapping in a virtual storage data processing system disclosed in U.S. Pat. No. 5,095,420 provides a method to map a main memory space to a non-main store data space through windowing overlays.

The computer system high speed link method and means disclosed in U.S. Pat. No. 5,218,677, describes a high speed data line for storage access. The link provides communications between a computer system and storage arrays. Communication is initiated with Page-in and Page-out commands.

U.S. Pat. No. 4,843,541 discloses a logical resource partitioning data processing system that describes a method of re-partitioning resources of a data processing system into logical partitions. Multiple operating systems can manage each logical partition.

A stand alone virtual memory manager for the PowerPC processor has been written and is described in *"VMMR: Virtual Memory MTU Reassembly"* by L. Womak, A Mendlson and R. Mraz; MASCOTS '97 conference 1/97.

Emerging technology, such as network computers, have created memory constrained devices that have a fixed amount of physical memory for execution. These execution environments rely on JAVA which controls the use of memory through object creation and collection in a fixed memory space.

SUMMARY OF THE INVENTION

The present invention provides a method and apparatus for allowing the fixed memory space of a network connected computer (e.g., client) to extend across commodity network boundaries through swapping of pages in virtual memory. The device for performing this service is termed a Memory Server. Data (e.g., file or memory data) is paged into an extended memory area for efficient retrieval and access by clients (hereinafter interchangeably referred to as network connected computers) requesting the data. As such, the prior art mechanical limitations of using a mechanical mass storage device for paging in and paging out data are eliminated and the efficiency is increased.

The method for extending the local memory of a network connected computer according to a first embodiment of the present invention identifies an insufficiency in the local memory of the network connected computer for executing an application. Once an insufficiency is identified, data is transferred (paged) from the local memory to a memory server. The data (e.g., file or memory data) is then transferred from another network connected computer (e.g., a network server or other peer in a peer-to-peer configuration) to the local memory of the network connected computer system, and the location of the data transferred from the other network connected computer (i.e., the network server or other peer) is re-mapped to a virtual location in the network connected computer. The network connected computer system can then continue with the program execution.

The memory server can be a memory area specifically allocated on a network server, a network connected computer, or in one peer computer in a peer-to-peer network configuration. In other embodiments, the memory server can be a remotely located dedicated computer connected to the computer network. In a further embodiment, the memory server is mirrored to provide additional reliability to the network clients.

The communication protocol for communication between the memory server, network server and network connected computers can be any reliable communication protocol that is capable of quick connects and disconnects, and request provided as options, such as, for example, as within RTSP Specification RFC 2326. Any open standard communication or a custom developed communication protocol could be used for memory server communication. The data transfer between the servers and network connected computers can be transmitted using TCP/IP.

The apparatus according to an embodiment of the invention comprises a memory server in communication with a computer network for providing additional memory to a network connected computer system (e.g., client) when it's local memory is insufficient for a particular application. The communication protocol between the network connected computer, network server, and memory server enable reliable communication for extending the memory of the network connected computer across network boundaries. With this ability, the network connected computers have an intermediate level of storage between main memory and mechanical disk drives. As such, applications that are memory bound (rather than computation bound) and could not be executed in a memory constrained environment such as the network client 10 of FIG. 1, can now be executed by paging to a memory server. As mentioned previously, this paging can be analogized to the paging to a standard mechanical device in a traditional system.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

The concept of a RAM (memory) server is different from the aforementioned technologies because the information within the user client is not replicated and updated as in existing virtual memory systems. No persistence of the data in RAM area is assumed other than what the application explicitly stores in execution. This makes the concept useful for emerging and future technologies of devices that contain no persistent storage and interact with network computers.

Additionally, these mechanisms can easily be used to hold the context of any network connected computer (i.e., client) by paging out all local storage to the memory server. The network connected computer can later request the image or context memory pages as necessary to continue execution. Alternatively, the state of this machine can easily be preserved for future access by network connected computers (clients).

Providing memory server capability within a networked environment allows for other advantages in addition to performance gains. In many switching networks, such as ATM, dedicated communication channels can be provided to guarantee quality of service for memory server communications. Additionally, broadcast function capabilities can be utilized for mirrored operations. This can provide fault tolerant memory service and eliminate the additional failure modes that can result from extending a node's memory space across multiple nodes. Memory service can also benefit from the low latency, high bandwidth communications offered by emerging network technologies such as, FDDI, ATM, Fast Ethernet, Gigabit Ethernet and custom networks such as SPX communications.

The memory server provides dedicated service to network connected computers to extend main memory in a reliable and efficient way. This service is secure and can be regulated for billing purposes. Furthermore, the concept of the memory server can be extended to allow "context serving" which is defined as saving and restoring the user's memory on demand for task switching and reduced latency of restarting of applications.

Figure 1:
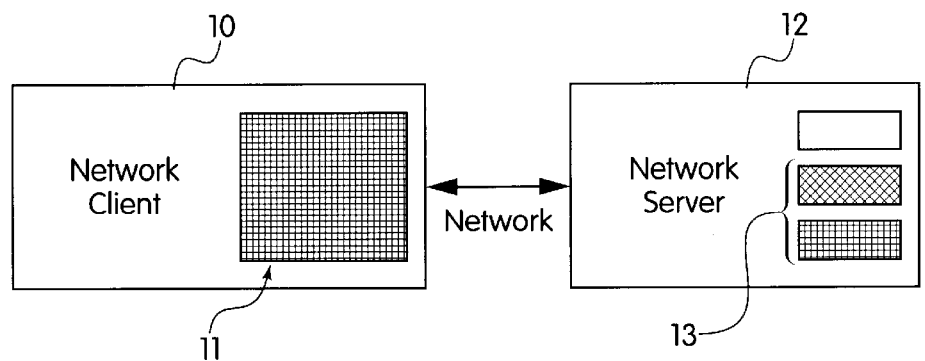
FIG. 1 is a block diagram of a network client of the prior art with constrained or fixed memory.

FIG. 1 shows a network client 10 according to the prior art where the client has a constrained or fixed size memory 11 system. The traditional network client 10 is a diskless machine (computer), and does not have virtual memory support with network server 12 and is therefore constrained by the actual amount of physical memory resident on the client system. The network server 12 provides persistent storage for boot images and applications 13 to load into a network connected computer (client).

Figure 2:
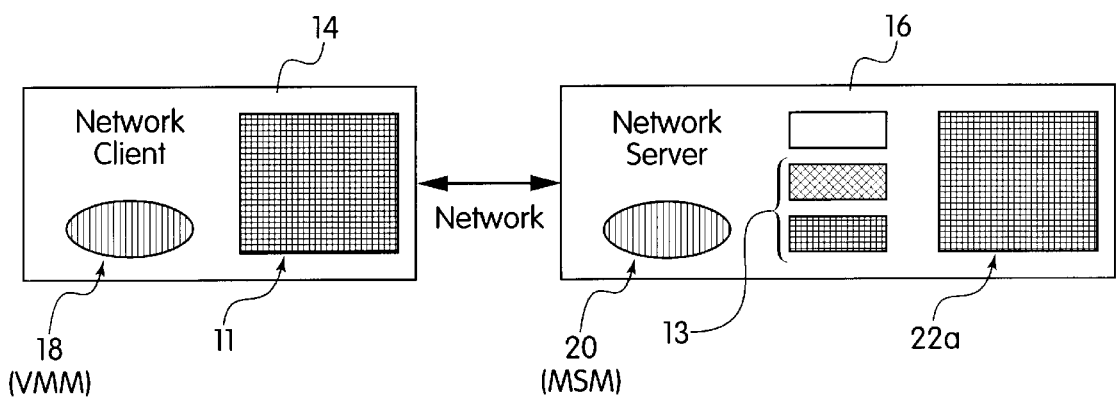
FIG. 2 is a block diagram of a network client having an extended main memory using a memory server according to an embodiment of the present invention.

FIG. 2 shows a block diagram of a first embodiment of the present invention with a network client 14 having an extended memory through the use of an assigned or allocated memory area 22a on network server 16. In this embodiment, the assigned/allocated memory area 22a is the memory server, and is physically resident on the network server 16.

The memory server system includes a virtual memory manager (VMM) 18 on the network client 14 and a memory server manager (MSM) 20 on the network server 16. The client VMM 18 is a system level service, whereas the MSM 20 can be run as a user application. Other features such as boot images and application loading 13 are unchanged, and supported as before (i.e., persistently stored in server 16). An optimization of the memory server can be to load new applications in the remote/allocated memory area 22a and migrate the pages to the network client as required for execution rather than downloading the entire application before invocation.

The operation of the memory server allows physical main memory to be extended across network boundaries. User data and programs are addressed as pages between clients and servers (operating system data that could not be operated remotely would involve network communication drivers, memory translation tables, etc.). In this embodiment of FIG. 2, the preferred mode of operation is that data reside either in the client, or the network server and only when the memory requirements of an application exceed that of the client's physical memory does the interaction with the memory server begin. When memory requirements are reduced below the physical limits of the client's local memory, interaction with the memory server is suspended.

Figure 3:
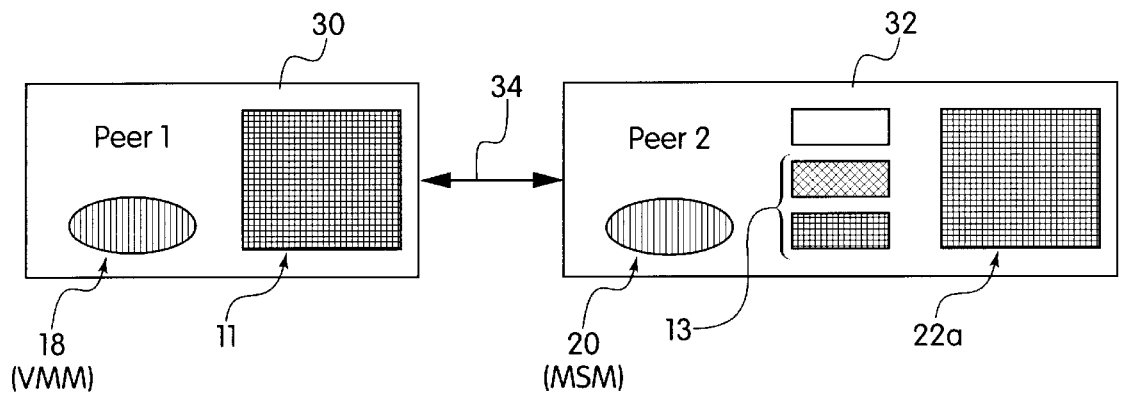
FIG. 3 is a block diagram of a peer-to-peer configuration having an extended main memory using a memory server according to another embodiment of the present invention.

FIG. 3 shows another embodiment for extending the main memory of a computer in a peer-to-peer configuration. As shown, peer 1 (30) is connected to peer 2 (32) via a connection 34. Connection 34 can be any suitable known type of peer-to-peer connection, such as, for example, BNC coaxial, TBase, null modem, etc. Peer 2(32) includes memory server manager 20, the boot images and applications 13, and the allocated memory area (i.e., memory server) 22a. Peer 1 (30) includes the virtual memory manager 18, and its own local memory 11. When the local memory 11 of the peer 1 (30) computer is insufficient for a current application, the use of memory server 22a is initiated. Upon initiation, the peer 1 (30) computer begins to page out data to the memory server 22a, and the memory server pages in data to the peer 1 (30) computer to continue the running of the current application. The operation of the memory server will be described with reference to FIGS. 4–6.

Figure 4:
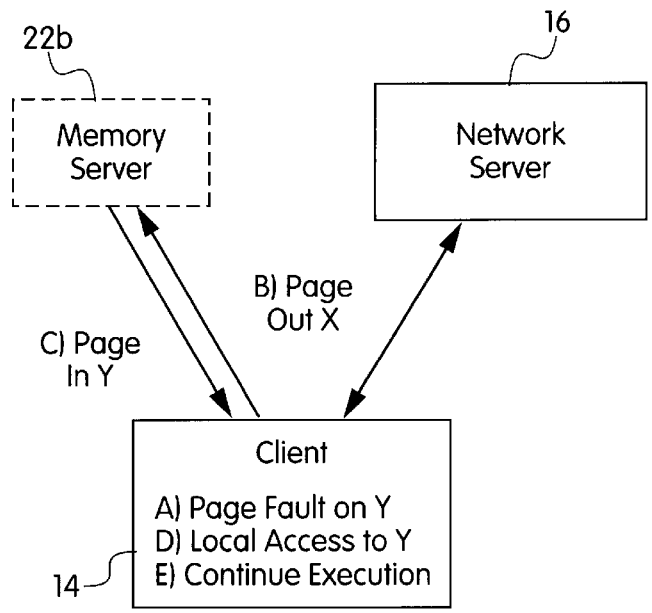
FIG. 4 is a block diagram illustrating a client server operation using a memory server according to an embodiment of the present invention.

In another embodiment, the memory server 22b can be a dedicated machine (computer), or contained within any other computer connected to the network and remote from the network server 16 which provides networked clients the capability to extend memory on demand (FIG. 4).

FIG. 4 shows an example of a client/server or peer-to-peer operation. In this example, the client (or peer) has completely used up its entire physical memory (0 to 128 Meg) for the operating system and application. All pages in excess of address 0800 0000 hex have been initialized on the memory server 22b at boot time. As previously explained, memory server 22b can be: resident on server 16; resident on another peer computer; or can be a separate dedicated computer connected directly to the computer network and the server via the network connection protocol (as shown in FIG. 4). The application being run has now requested an additional 2048 bytes of memory to temporarily compute a result. To allow the client CPU to create and modify the area, this page must be resident in the client (peer). The virtual memory subsystem would then page-fault on access to this location.

Referring to FIGS. 2–4, the Page Fault on Y is the first operation of the sequence (i.e., the identification of insufficient memory space for the required application execution). The virtual memory manager 18 (i.e., page-fault handler) would then free up some local memory by migrating data (i.e, paging out data) to the memory server 22b. This is shown by step B, where Page Out X to the memory server 22b performed. At this point, a single page has been migrated based on a page replacement algorithm (e.g., 0004 0000) and the client's virtual memory address is logged in the memory server's translation table along with the memory server's virtual memory address. Next, the desired data Y is paged in to the client from the network server 16 (step C). The client then records the real location as the virtual location Y to provide local access to Y (step D). The client then continues the program execution accordingly (step E). The sequence of operations shown in FIG. 4 show an exemplary method to service the client's (peer's) extended memory across the network.

Extending memory across a network implies that a remotely located memory server can cause reliability concerns. At any time the memory server can terminate interaction with the client due to a power failure or other service interruption. If the client has a persistent storage device, such as a hard drive, all paged information would reside on this device. Since one embodiment of the present invention utilizes a network client, additional reliability across the network is desirable. This reliability can be provided by mirroring the data on the memory server itself.

The mirrored server can provide the additional persistence of hard disk writing to allow data and information to be saved in the event of both the primary and mirrored memory server have power service interruptions or similar failures. For performance concerns, the mirror memory server does not interact directly with the client and only records/writes. To maintain performance, the mirroring of Page X (step C, FIG. 5) to the mirror memory server and Page In of Y (Step E, FIG. 5) to the client can happen concurrently.

Figure 5:
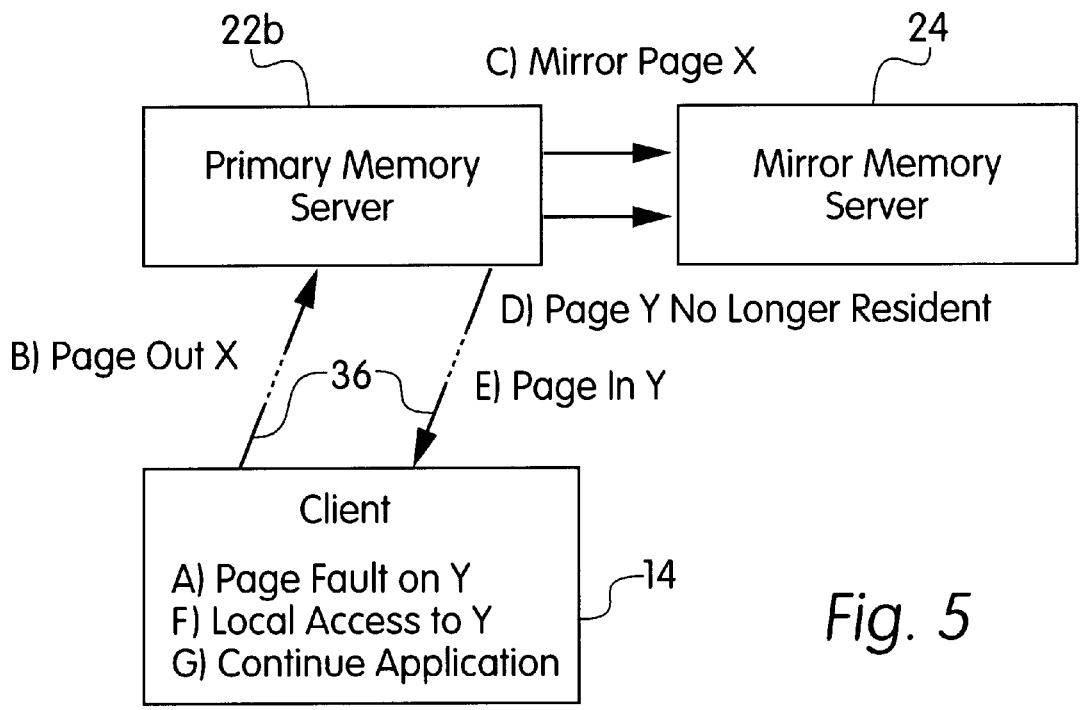
FIG. 5 is a block diagram illustrating a client server operation with a mirrored memory server according to an embodiment of the present invention.

FIG. 5 shows an exemplary embodiment of a mirrored memory server configuration according to an embodiment of the invention. The client experiences a Page Fault on access to memory location Y due to insufficient local memory (step A) and pages out X to the primary memory server 22b via the network server or other network connected computer (not shown) to create space for the desired data (step B). The primary memory server 22b mirrors page X to the mirror memory server 24 (step C) for added reliability, and informs the mirror memory server 24 that Page Y is no longer resident in the primary memory server 22b (step D). The client Pages In the desired data Y (Step E) from the network server (not shown), and re-maps the real location of Y to the virtual location Y on the client (step F). The client can then continue the execution of the application (step G). As noted above, the mirroring of page X into the mirror memory server 24 and the Page In of Y into the client can occur simultaneously. The connections 36 between client 14 and primary memory server 22b are shown in broken configuration to indicate that the client is connected to a network server (or other peer, not shown) in addition to the memory server 22b.

Another use of the memory server is the serving of all memory states in a network connected machine. This would essentially save the user and system environment for recovery and user application swapping. Additionally, a complete system image can be saved and restored if an image of the CPU's internal register state can be placed in memory. This can then be saved and restored at will to the saved system and user environment. This is useful when a user may want to save his working environment and resume execution at another network computer. The context saving and restoring mechanism allows the user to continue at the same point of execution.

Figure 6:
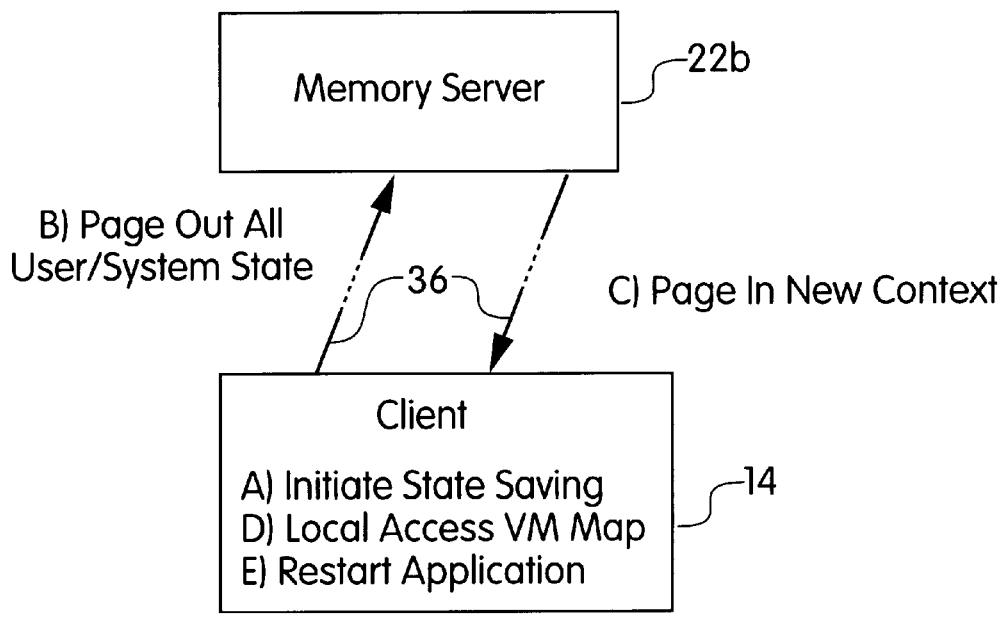
FIG. 6 is a block diagram of illustrating a context server operation according to an embodiment of the present invention.

FIG. 6 shows the sequence of operations to save and restore system and user context state in the client and memory server. As shown, the client first initiates context swap (i.e., state saving) (step A), and then Pages out all user and system state information to the memory server 22b (step B). The client Pages in the new context (step C), and sets up address translations as required to provide local access in the virtual memory map. Finally, the client can restart the application (step E) from the same context as previously left while being at another client computer on the network.

It should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. A method for extending a local memory of a network device, comprising the steps of:

identifying an insufficiency in the amount of memory in the local memory of the network device for executing an application;

freeing up local memory space by paging out data to a memory server that is allocated to the network device, wherein the memory server resides in a dedicated memory server computer connected to the network; and paging in data to the local memory of the network device from a remote location on the network to continue execution of the application.

2. The method of claim 1, further comprising the steps of:

mirroring the data that is paged out to the allocated memory server to a mirror memory server; and informing the mirror memory server that the data paged in to the local memory from the allocated memory server is no longer resident in the allocated memory server.

3. The method of claim 1, further comprising the steps of:

providing a virtual memory manager in the network device; and providing a memory server manager on at least one other network device.

4. A method for extending the local memory of a network connected computer (client) across network boundaries comprising the steps of:

allocating a memory area in communication with the computer network, wherein said step of allocating is performed within a dedicated memory server computer connected to the network and a network server;

transferring data from the local memory of the network connected computer to the allocated memory area;

transferring data from the allocated memory to the local memory of the computer system as needed;

recording a location of the data transferred to the allocated memory in the network connected computer; and continuing execution of an application.

5. The method as claimed in claim 4, further comprising the step of:

identifying an insufficient amount of the local memory in the network connected computer for executing the application, said steps of transferring data being performed after said step of identifying.

6. The method as claimed in claim 4, wherein said step of allocating is performed within a memory resident on a network server.

7. The method as claimed in claim 4, further comprising the steps of:

providing a mirror memory server in communication with said allocated memory area;

mirroring the data transferred from the local memory to the allocated memory area to the mirror memory server; and informing the mirror memory server that the data transferred to the local memory from the allocated memory area is no longer resident in the allocated memory area.

8. The method as claimed in claim 4, further comprising the step of providing a communication protocol between the network connected computer, and the allocated memory area.

9. The method as claimed in claim 7, further comprising the step of providing a communication protocol between the network connected computer, the allocated memory area and the mirror memory server.

10. A method for extending the local memory of a network connected computer (client) across network boundaries comprising the steps of:

allocating a memory area in communication with the computer network;

transferring data from the local memory of the network connected computer to the allocated memory area;

transferring data from the allocated memory to the local memory of the computer system as needed;

recording a location of the data transferred to the allocated memory in the network connected computer; and continuing execution of an application, and further comprising the steps of:

providing a virtual memory manager in each network connected computer; and providing a memory server manager on at least one network connected computer.

11. An apparatus for extending a local memory of a computer connected to a computer system comprising:

a memory server for providing additional memory to the computer system when an insufficiency in local memory is determined; and communication means coupled to said memory server and the computer system for enabling the extension of the local memory of the computer to the memory server by the computer system, wherein said communication means further comprises:

a computer network connecting a plurality of computers to a network server and the memory server, said computer system being one of said plurality of computers connected to the computer network;

control means disposed in each of said plurality of computers and the network server for controlling communication between each of said plurality of computers, the network server, and the memory server; and a communication protocol for enabling efficient communication between said control means and said memory server.

12. The apparatus according to claim 11, wherein said memory server comprises a designated memory area resident on the network server.

13. The apparatus according to claim 11, wherein said memory server comprises a designated computer connected to the computer network.

14. The apparatus according to claim 11, wherein said control means comprises:

a virtual memory manager in each of said plurality of computers; and a memory server manager disposed within the network server.

15. The apparatus of claim 11, wherein data defining the local memory is transferred to the memory server, and the data from the memory server is transferred to the computer system as needed.

* * * * *

UNITED STATES PATENT AND TRADEMARK OFFICE
CERTIFICATE OF CORRECTION

PATENT NO.     : 6,516,342 B1
DATED          : February 4, 2003
INVENTOR(S)    : Feldman et al.

It is certified that error appears in the above-identified patent and that said Letters Patent is hereby corrected as shown below:

<u>Title page,</u>
Item [75], Inventors, "Ronald Marz" should read -- Ronald Mraz --

Signed and Sealed this

Fifteenth Day of July, 2003

JAMES E. ROGAN
*Director of the United States Patent and Trademark Office*